United States Patent Office 3,594,399
Patented July 20, 1971

3,594,399
MANUFACTURE OF ALCOHOLS BY OXIDATION OF SATURATED HYDROCARBONS
Jacob Alagy, La Celle-Saint-Cloud, France, assignor to Institut Francais du Petrole des Carburants et Lubrifiants, Rueil-Malmaison, France
No Drawing. Filed Feb. 7, 1968, Ser. No. 703,529
Claims priority, application France, Mar. 1, 1967, 97,048
Int. Cl. C07f 5/04; C07c 35/08
U.S. Cl. 260—462A
4 Claims

ABSTRACT OF THE DISCLOSURE

A process for converting cyclohexane to cyclohexanol by contacting the cyclohexane in the liquid phase with gas containing molecular oxygen wherein the oxidation step is conducted in the presence of sulfate of the alkali and alkaline earth metals.

---

It is known that oxidation of saturated linear or cyclic hydrocarbons, in the presence of boric acid, results in the formation of the boric esters of the alcohols corresponding to said hydrocarbons.

For example, the oxidation of cyclohexane under these conditions gives a cyclohexyl borate. Other oxidizable hydrocarbons are those which contain from 6 to 18 carbon atoms per molecule, for instance hexane, heptane, octane, isooctane, decane, cyclooctane, cyclododecane, methylcyclohexane and dimethylcyclohexanes.

By hydrolysation of the reaction product, either before or after the separation of the unconverted hydrocarbon, there is recovered boric acid in a solid state or an aqueous phase containing boric acid, which aqueous phase may be subjected to a crystallization step so as to recover solid boric acid and mother-liquors, as well as an organic phase containing the desired alcohol, for example cyclohexanol. As hydrolyzation agent, one can use, for example water or the mother-liquors from the stage of crystallization of boric acid, or both. In most cases there are used 0.1 to 2 parts of aqueous phase per part of organic phase (by volume) and the temperature is comprised between 50° C. and about 170° C.

The solid boric acid is generally re-used, after a treatment for purification, drying and dehydration with a new charge of hydrocarbon to oxidize.

The present invention is based on the surprising discovery that the above-mentioned reaction of oxidizing hydrocarbons in the presence of boric acid, can be carried out with a substantially increased yield when the reaction mixture contains, in specific amounts, soluble or insoluble sulphates of alkali or alkaline-earth metals.

This is particularly surprising in view of the fact that such salts have, until now, never exhibited catalytic properties in oxidation reactions.

However, it has been observed that, with a reaction medium containing from 100 to 5,000 (preferably from 200 to 1,000) parts per million of parts (expressed in weight of $SO_3$ with respect to the weight of boric acid) of alkali or alkaline-earth sulphates such as for example calcium, barium, sodium or potassium sulphate, better results were obtained in the oxidation of hydrocarbons to the corresponding alcohols as in the case of a reaction medium which does not contain said sulphates (or contains the same but in proportions which differ from those hereabove mentioned).

The improving features object of this invention may be used in combination with other proposed improving features for this type of oxidation.

The general conditions for oxidizing saturated hydrocarbons in the liquid phase are well known, the temperature range being generally of from 130 to 220° C.

The following Examples 1 to 4, given for illustration purposes only, are not intended to limit in any way the scope of the invention. Examples 1A, 1B and 1C are given for comparison purposes and are no part of the invention.

EXAMPLE 1

In a reaction vessel maintained at 170° C. is continuously oxidized, under a pressure of 10.5 kg./cm.$^2$, a liquid cyclohexane feed of 48 liters per hour.

The reaction vessel is fed with a gas stream consisting essentially of nitrogen (94% by volume) and oxygen (6% by volume), the proper feeding rate of this latter gas corresponding to 950 liters per hour of pure oxygen.

Besides there is introduced, at a rate of 2 kg. per hour, metaboric acid having a 300 p.p.m. (parts per million) content of alkaline-earth sulphates expressed in $SO_3$.

After hydrolyzation of the outflow from the reaction vessel and separation of the unconverted cyclohexane, there is obtained a mixture of cyclohexanol+cyclohexanone with a molar yield in these two compounds of 92% and a conversion rate of cyclohexane equal to 12%.

EXAMPLES 1A, 1B and 1C

Example 1 is repeated with the use of a metaboric acid having respectively a null content (Example 1A), a 50 p.p.m. content (Example 1B) and a 7,600 p.p.m. content (Example 1C) of alkaline-earth sulphates expressed in $SO_3$.

All other conditions being identical to those of Example 1 (temperatures, feeding rates etc.) there is obtained a mixture of cyclohexanol+cyclohexanone with yields (R) and conversion rates (C) as follows:

|  | R percent | C percent |
|---|---|---|
| Example: | | |
| 1A | 89.8 | 10.2 |
| 1B | 90.5 | 11.5 |
| 1C | 89.8 | 11.0 |

It can be seen that the results are substantially less than in Example 1.

EXAMPLES 2, 3 and 4

Example 1 is repeated with the use of a metaboric acid containing respectively 100 and 1,000 p.p.m. of alkaline-earth sulphates expressed in $SO_3$. In Example 4 there is used pure metaboric acid and 200 p.p.m. of sodium sulphate are introduced separately.

All other conditions being identical to those of Example 1, the following results are obtained:

|  | R percent | C percent |
|---|---|---|
| Example: | | |
| 2 | 91.85 | 11.90 |
| 3 | 91.90 | 11.95 |
| 4 | 92.10 | 11.80 |

What is claimed as this invention is:

1. In a process for oxidizing cyclohexane by contacting said cyclohexane in the liquid phase with a gas containing molecular oxygen, in the presence of a boron compound selected from the group consisting of boric acid, boric ester and boric anhydride and at a temperature between about 130° C. and about 220° C., the improvement which comprises conducting the oxidation step in the presence of about 200 to 1,000 parts by weight of sulfates of metals selected from the group consisting of alkali and alkaline earth metals, expressed as $SO_3$ per million parts by weight of the boron compound.

2. The process of claim 1, wherein the boron compound is metaboric acid.

3. The process of claim 1, wherein the metal is selected from the group consisting of sodium, potassium, calcium and barium.

4. The process of claim 1, wherein the sulfate is sodium sulfate.

References Cited

UNITED STATES PATENTS

| | | | |
|---|---|---|---|
| 2,410,642 | 11/1946 | Farkas et al. | 260—632C |
| 3,232,704 | 2/1966 | Helbig et al. | 260—631B |
| 3,287,423 | 11/1966 | Steeman et al. | 260—631B |
| 3,420,897 | 1/1969 | Russell et al. | 260—631B |

FOREIGN PATENTS

| | | | |
|---|---|---|---|
| 274,867 | 1/1965 | Australia | 260—631B |
| 948,394 | 2/1964 | Great Britain | 260—631B |
| 1,073,522 | 6/1967 | Great Britain | 260—631B |

OTHER REFERENCES

Morris, "Reagent Chemicals," (1944), pp. 22, 23.

Mallinckrodt, "Laboratory Chemicals," (1960), pp. 61, 62.

Rosin, "Chemicals and Standards," 2nd ed. (1946), pp. 92, 93.

BERNARD HELFIN, Primary Examiner

J. E. EVANS, Assistant Examiner

U.S. Cl. X.R.

260—617H, 631B, 639B